(12) United States Patent
Kim (10) Patent No.: US 8,896,962 B2
(45) Date of Patent: Nov. 25, 2014

(54) SPINDLE MOTOR AND HARD DISK DRIVE INCLUDING THE SAME

(71) Applicant: Samsung Electro-Mechanics Co., Ltd., Suwon (KR)

(72) Inventor: Duck Young Kim, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/945,566

(22) Filed: Jul. 18, 2013

(65) Prior Publication Data
US 2014/0293478 A1 Oct. 2, 2014

(30) Foreign Application Priority Data
Mar. 29, 2013 (KR) .................. 10-2013-0034274

(51) Int. Cl.
*G11B 19/20* (2006.01)

(52) U.S. Cl.
USPC ........................................ 360/99.08

(58) Field of Classification Search
USPC ...................................... 360/99.08
See application file for complete search history.

(56) References Cited

U.S. PATENT DOCUMENTS

| | | | | |
|---|---|---|---|---|
| 8,553,355 B2 * | 10/2013 | Mizukami et al. | ......... | 360/99.08 |
| 8,724,257 B2 * | 5/2014 | Sekii et al. | ................. | 360/99.08 |
| 8,737,019 B2 * | 5/2014 | Fuss | ........................... | 360/99.08 |
| 2004/0113501 A1 | 6/2004 | Tokunaga et al. | | |
| 2009/0080819 A1 | 3/2009 | Rehm | | |
| 2012/0013213 A1 | 1/2012 | Kim | | |

FOREIGN PATENT DOCUMENTS

| | | |
|---|---|---|
| JP | 2004-112874 | 4/2004 |
| JP | 2008-64302 | 3/2008 |
| KR | 10-2012-0006717 | 1/2012 |
| KR | 10-2012-0076263 | 7/2012 |
| KR | 10-2013-0016806 | 2/2013 |

OTHER PUBLICATIONS

Korean Office Action issued Apr. 23, 2014 in corresponding Korean Patent Application No. 10-2013-0034274.

\* cited by examiner

*Primary Examiner* — Mark Blouin (57) ABSTRACT

There are provided a spindle motor and a hard disk drive including the same. The spindle motor includes: a sleeve installed on a base member and having a circulation hole; a shaft inserted into the sleeve; a rotor hub installed on an upper end portion of the shaft; and a thrust member installed in an installation groove formed in an upper portion of the sleeve and forming a connection part, the connection part allowing the circulation hole to be in communication with a sealing part formed by the sleeve and the rotor hub and having a liquid-vapor interface disposed therein, wherein the connection part is formed between the sleeve and the thrust member in a circumferential direction, and at least any one part of the connection part has a radial gap wider than that of another part thereof in the circumferential direction.

11 Claims, 9 Drawing Sheets

SPINDLE MOTOR AND HARD DISK DRIVE INCLUDING THE SAME

CROSS-REFERENCE TO RELATED APPLICATIONS

This application claims the priority of Korean Patent Application No. 10-2013-0034274 filed on Mar. 29, 2013, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

Generally, a small spindle motor used in a hard disk drive (HDD) serves to rotate a disk so that a magnetic head can write data to the disk or read data from the disk.

In addition, the spindle motor is provided with a hydrodynamic bearing assembly, and a bearing clearance formed in the hydrodynamic bearing assembly is filled with a lubricating fluid.

In addition, at the time of rotation of a shaft, the lubricating fluid in the bearing clearance is pumped to form fluid dynamic pressure therein, thereby rotatably supporting the shaft.

However, pressure lower than atmospheric pressure, that is, negative pressure, may be generated in the bearing clearance due to the pumping of the lubricating fluid at the time of rotation of the shaft.

In this case, air contained in the lubricating fluid expands, such that air bubbles are formed. When such air bubbles are introduced into a groove pumping the lubricating fluid, deterioration of rotational characteristics such as the generation of insufficient fluid dynamic pressure, the generation of vibrations, and the like, may occur.

Therefore, a circulation hole for decreasing the generation of negative pressure is formed in a sleeve to suppress the generation of negative pressure.

In the following Related Art Document (US 2009-0080819), a configuration in which a circulation hole for decreasing the generation of negative pressure is formed to be inclined and connects a bearing clearance formed by a sleeve and a cover member and a bearing clearance in which a liquid-vapor interface is formed to each other has been used.

However, it may be difficult to process the circulation hole and a defect may occur in the sleeve at the time of processing the circulation hole.

RELATED ART DOCUMENT (Patent Document 1) US Patent Laid-Open Publication No. 2009-0080819

SUMMARY OF THE INVENTION

An aspect of the present invention provides a spindle motor capable of decreasing the generation of negative pressure. That is, a spindle motor capable of easily connecting a sealing part in which a liquid-vapor interface is disposed and a lower end portion of a bearing clearance to each other in order to decrease the generation of negative pressure is provided.

Aspect of the present invention also provides a motor capable of easily discharging air that may be contained in a lubricating fluid. Particularly, an aspect of the present invention provides a motor capable of easily discharging air and more reliably removing air that may be contained in a lubricating fluid re-circulated to a bearing clearance by allowing the air to be separated from the lubricating fluid.

According to an aspect of the present invention, there is provided a spindle motor including: a sleeve fixedly installed on a base member and having a circulation hole formed in an axial direction; a shaft rotatably inserted into the sleeve; a rotor hub fixedly installed on an upper end portion of the shaft in the axial direction; and a thrust member installed in an installation groove formed in an upper portion of the sleeve in the axial direction and forming a connection part at the time of being installed in the installation groove, the connection part allowing the circulation hole to be in communication with a sealing part formed by the sleeve and the rotor hub and having a liquid-vapor interface disposed therein, wherein the connection part is formed between the sleeve and the thrust member in a circumferential direction, and at least any one part of the connection part has a radial gap wider than that of another part thereof in the circumferential direction.

A transversal cross section of the thrust member in a radial direction may have a trapezoidal shape.

The thrust member may have an inclined surface, and a facing surface of the installation groove disposed to face the inclined surface and the inclined surface may be disposed to be spaced apart from each other by a predetermined distance to form the connection part in the case in which the thrust member is installed in the installation groove.

A surface of the thrust member forming the connection part between the thrust member and the sleeve may be provided with a first gap extension groove formed in the axial direction.

A facing surface of the installation groove of the sleeve forming the connection part between the sleeve and the thrust member may be provided with a second gap extension groove formed in the axial direction.

The thrust member may include a thrust dynamic groove formed in an upper surface thereof in order to generate thrust fluid dynamic pressure.

The sleeve and the thrust member may be formed of different materials or have outer surfaces coated with different materials.

The spindle motor may further include a cover member fixedly installed on a lower surface of the sleeve to prevent leakage of a lubricating fluid.

The thrust member may have an inner peripheral surface and a lower surface bonded to the installation groove of the sleeve.

The connection part may have a gap that is narrowed in an outer diameter direction.

According to another aspect of the present invention, there is provided a hard disk drive including: the spindle motor as described above rotating a disk by power applied thereto through a substrate; a magnetic head writing data to and reading data from the disk; and a head driving part moving the magnetic head to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
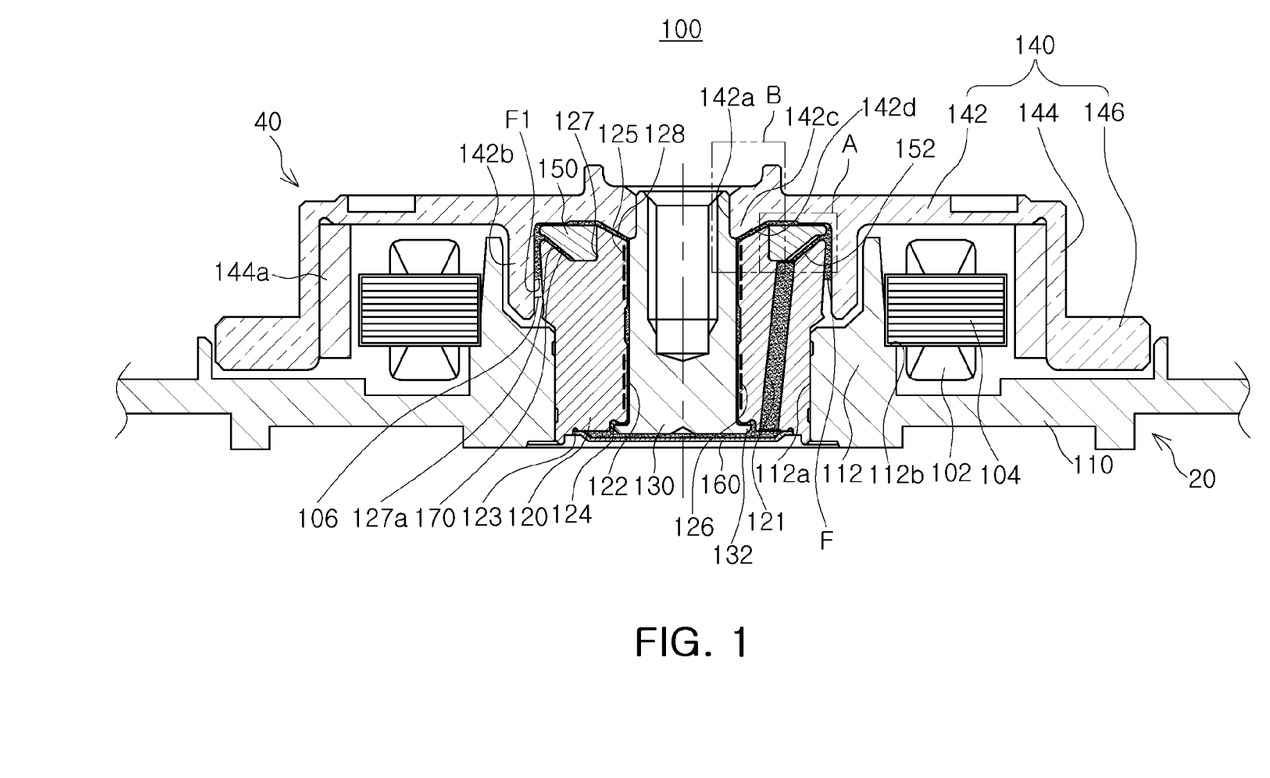
FIG. 1 is a schematic cross-sectional view showing a spindle motor according to an embodiment of the present invention.
Figure 2:
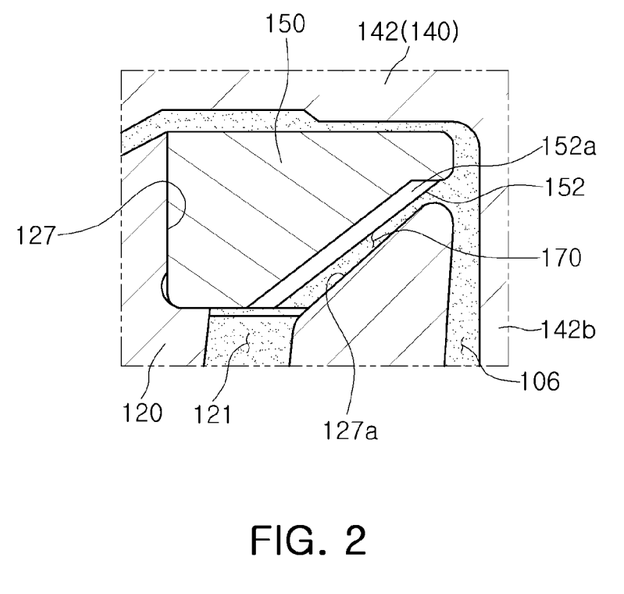
FIG. 2 is an enlarged view of the part A of FIG. 1.
Figure 3:
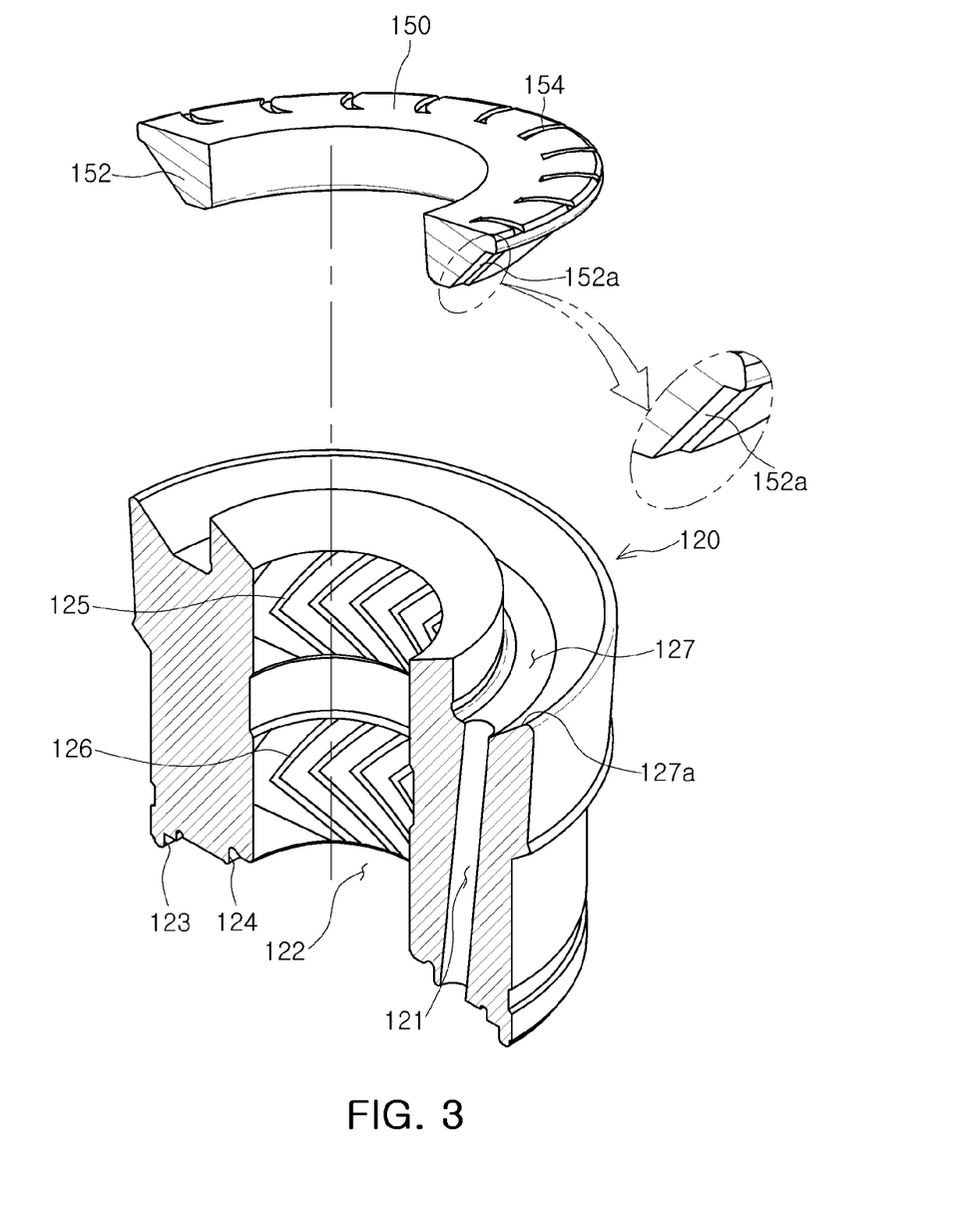
FIG. 3 is a partially cut-away exploded perspective view showing a sleeve and a thrust member included in the spindle motor according to the embodiment of the present invention.
Figure 4:
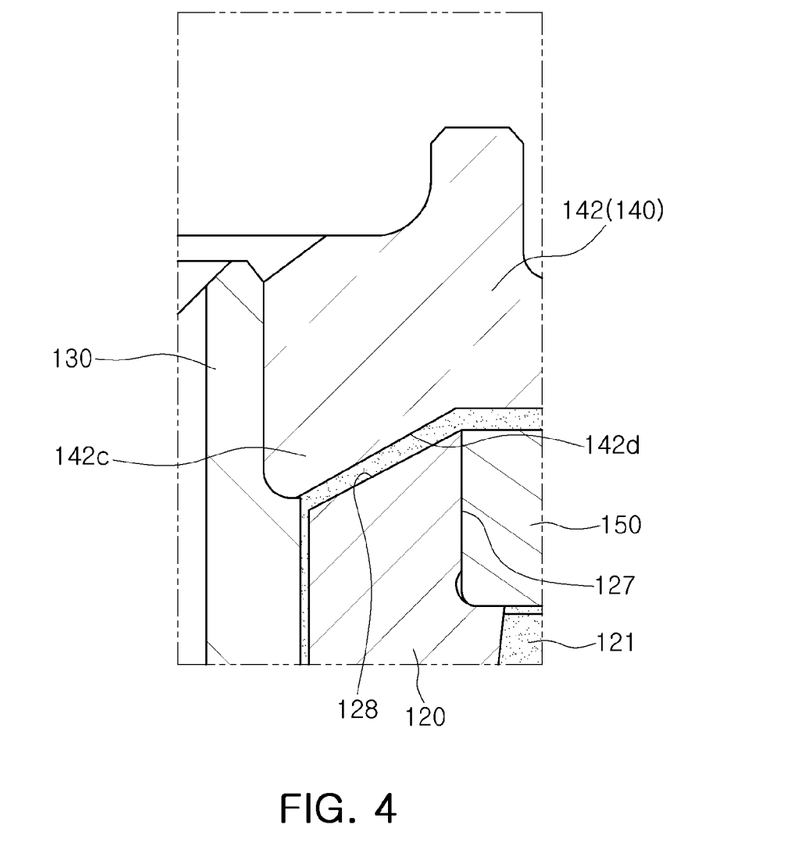
FIG. 4 is an enlarged view of the part B of FIG. 1.
Figure 5:
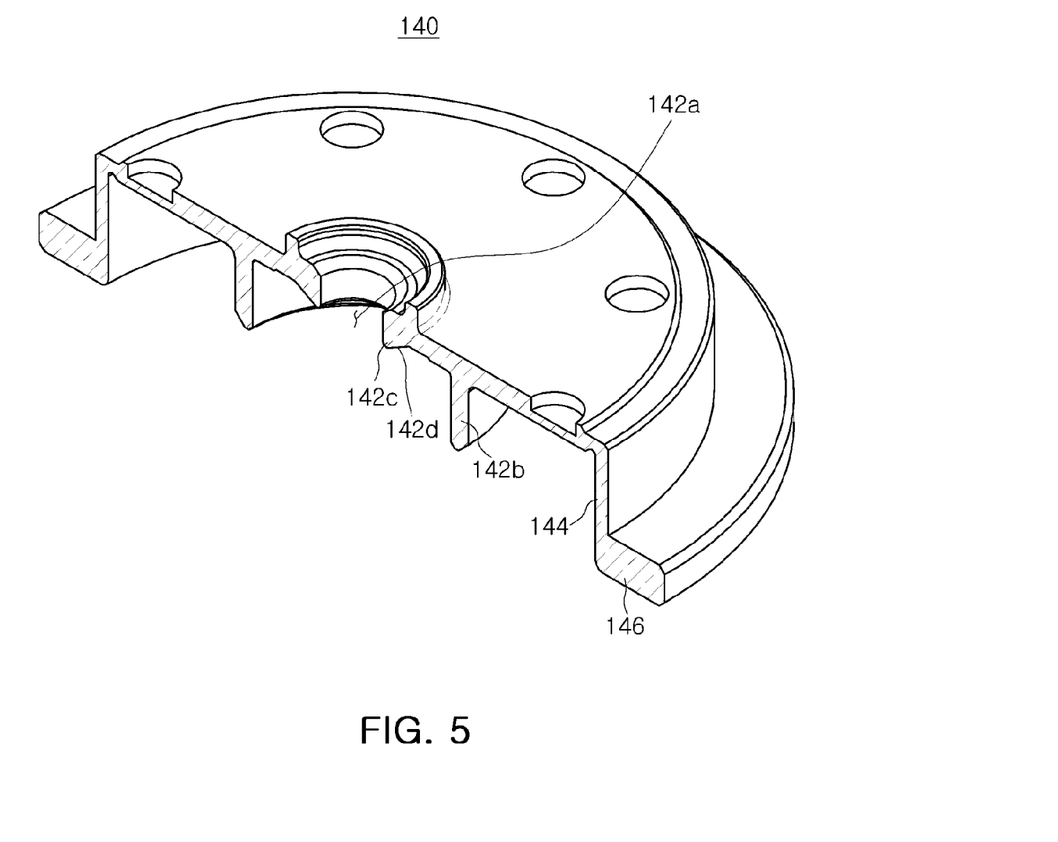
FIG. 5 is a partially cut-away perspective view showing a rotor hub according to the embodiment of the present invention.

FIG. 1 is a schematic cross-sectional view showing a spindle motor according to an embodiment of the present invention; FIG. 2 is an enlarged view of the part A of FIG. 1; FIG. 3 is a partially cut-away perspective view showing a sleeve and a thrust member included in the spindle motor according to the embodiment of the present invention; FIG. 4 is an enlarged view of the part B of FIG. 1; and FIG. 5 is a partially cut-away exploded perspective view showing a rotor hub according to the embodiment of the present invention.

Referring to FIGS. 1 through 5, the spindle motor 100 according to the embodiment of the present invention may include a base member 110, a sleeve 120, a shaft 130, a rotor hub 140, a thrust member 150, and a cover member 160 by way of example.

The spindle motor 100 may be a motor used in a recording disk driving device driving a recoding disk.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, and a radial direction refers to a horizontal direction, that is, a direction from an outer peripheral surface of the rotor hub 140 toward the shaft 130 or from the shaft 130 toward the outer peripheral surface of the rotor hub 140.

In addition, a circumferential direction refers to a rotation direction along a radius at a predetermined position in the radial direction based on the center of rotation of the rotor hub 140 or the shaft 130.

The base member 110, which is a fixed member, may configure a stator 20. Here, the stator 20, which means all fixed members except for a rotating member, may include the base member 110, the sleeve 120, and the like.

In addition, the base member 110 may include an installation wall part 112 having the sleeve 120 inserted thereinto.

The installation wall part 112 may protrude in an upward axial direction and include an installation hole 112a formed therein so that the sleeve 120 may be inserted thereinto.

In addition, the installation wall part 112 may have a support surface 112b formed on an outer peripheral surface thereof so that a stator core 104 may be seated thereon, wherein the stator core 104 has a coil 102 wound therearound. That is, the stator core 104 may be fixedly installed on the outer peripheral surface of the installation wall part 112 by an adhesive in a state in which it is seated on the support surface 112b.

However, the stator core 104 may also be installed on the outer peripheral surface of the installation wall part 112 in a press-fitting scheme without using the adhesive. That is, a scheme of installing the stator core 104 is not limited to a scheme of using the adhesive.

In addition, the base member 110 may be manufactured by performing die-casting using an aluminum (Al) material. Alternatively, the base member 110 may also be molded by performing plastic working (for example, press working) on a steel plate.

That is, the base member 110 may be manufactured by various materials and various processing methods, and is not limited to the base member 110 shown in the accompanying drawings.

The sleeve 120, which is a fixed member configuring, together with the base member 110, the stator 20, may be fixedly installed on the base member 110 and include a circulation hole 121.

That is, the sleeve 120 may be inserted into and fixed to the above-mentioned installation wall part 112. In other words, a lower end portion of an outer peripheral surface of the sleeve 120 may be bonded to an inner peripheral surface of the installation wall part 112 by at least one of an adhesion method, a welding method, and a press-fitting method.

In addition, the circulation hole 121 may be extended from a lower surface of the sleeve 120 in the axial direction and be inclined. Although the case in which the circulation hole 121 is formed in the axial direction and is inclined has been described by way of example in the present embodiment, the present invention is not limited thereto.

That is, the circulation hole 121 may also be formed in the radial direction so as to be parallel with an upper surface of the base member 110 and be formed in parallel with the shaft 130 in the axial direction. In addition, the circulation hole may also be configured of two holes, that is, a hole formed in the axial direction and a hole formed in the radial direction.

Meanwhile, the sleeve 120 may include a shaft hole 122 formed therein, wherein the shaft hole 122 has the shaft 130 inserted thereinto. The shaft 130 may be inserted into the shaft hole 122 and be rotatably supported by the sleeve 120.

In addition, the sleeve 120 may include a mounting groove 123 formed at a lower end portion thereof, wherein the mounting groove 123 has a cover member 160 installed therein in order to prevent leakage of the lubricating fluid. In addition, at the time of installing the cover member 160 a bearing clearance filled with the lubricating fluid may be formed by an upper surface of the cover member 160 and a lower surface of the sleeve 120.

Next, the bearing clearance will be described.

The bearing clearance indicates a clearance filled with the lubricating fluid. That is, all of the clearance formed by an inner peripheral surface of the sleeve 120 and an outer peripheral surface of the shaft 130, the clearance formed by the sleeve 120 and the rotor hub 140, the clearance formed by the cover member 160 and the sleeve 120, and the clearance formed by the cover member 160 and the shaft 130 will be defined as the bearing clearances.

In addition, the spindle motor 100 according to the present embodiment may have a structure in which the lubricating fluid is filled in all of the above-mentioned bearing clearances. This structure may also be called a full-fill structure.

Meanwhile, the sleeve 120 may have a step groove 124 formed at a lower end portion thereof. A detailed description of the step groove 124 will be provided below.

In addition, the sleeve 120 may include upper and lower radial dynamic grooves 125 and 126 formed in an inner peripheral surface thereof in order to generate fluid dynamic pressure at the time of rotational driving of the shaft 130. In addition, the upper and lower radial dynamic grooves 125 and 126 may be disposed to be spaced apart from each other by a predetermined distance and have a herringbone or spiral shape.

However, the above-mentioned upper and lower radial dynamic grooves 125 and 126 are not limited to being formed in the inner peripheral surface of the sleeve 120, but may also be formed in the outer peripheral surface of the shaft 130.

In addition, the sleeve 120 may have an installation groove 127 formed at an upper end portion thereof, wherein the installation groove 127 has the above-mentioned thrust member 150 installed therein. The installation groove 127 may have a shape corresponding to that of the thrust member 150, and one side of the circulation hole 121 may be opened to the bottom surface of the installation groove 127.

A more detailed description of the installation groove 127 will be provided at the time of describing the thrust member 150.

In addition, the sleeve 120 may have a downwardly inclined surface 128 formed on an upper surface thereof, wherein the downwardly inclined surface 128 is inclined downwardly toward the shaft hole 121. The downwardly inclined surface 128 may be disposed at an inner side of the installation groove 127 in the radial direction and serve to allow an inner diameter portion of the rotor hub 140 to be formed at a thick thickness.

The shaft 130, which is a rotating member, may configure a rotor 40. Here, the rotor 40 means a member rotatably supported by the stator 20 to thereby rotate.

Meanwhile, the shaft 130 may be rotatably supported by the sleeve 120. In addition, the shaft 130 may include a stopper part 132 formed at a lower end portion thereof, wherein the stopper part 132 is inserted into a step groove 124.

The stopper part 132 may be extended from the lower end portion of the shaft 130 in an outer diameter direction and serve to prevent excessive floating of the shaft 130 simultaneously with preventing the shaft 130 from being separated upwardly from the sleeve 120.

That is, the stopper part 132 may prevent the shaft 130 from being separated upwardly from the sleeve 120 due to external impact. In addition, the shaft 130 may be floated at a predetermined height at the time of being rotated. At this time, the stopper part 132 may serve to prevent the shaft 130 from being excessively floated.

Further, the shaft 130 may have the rotor hub 140 coupled to an upper end portion thereof. To this end, in the case in which the shaft 130 is installed in the sleeve 120, the upper end portion of the shaft 130 may be disposed to protrude upwardly of the sleeve 120.

The rotor hub 140, which is a rotating member configuring, together with the shaft 130, the rotor 40, may be fixedly installed on the upper end portion of the shaft 130 and rotate together with the shaft 130.

Meanwhile, the rotor hub 140 may include a rotor hub body 142 provided with an mounting hole 142a into which the upper end portion of the shaft 130 is inserted, a magnet mounting part 144 extended from an edge of the rotor hub body 142 in a downward axial direction, and a disk seating part 146 extended from a distal end of the magnet mounting part 144 in the outer diameter direction.

In addition, the magnet mounting part 144 may have a driving magnet 144a installed on an inner surface thereof, wherein the driving magnet 144a is disposed to face a front end of the stator core 104 having the coil 102 wound therearound.

Meanwhile, the driving magnet 144a may have an annular ring shape and be a permanent magnet generating magnetic force having a predetermined strength by alternately magnetizing N and S poles in the circumferential direction.

Here, rotational driving of the rotor hub 140 will be briefly described. When power is supplied to the coil 102 wound around the stator core 104, driving force capable of rotating the rotor hub 140 may be generated by an electromagnetic interaction between the driving magnet 144a and the stator core 104 having the coil 102 wound therearound.

Therefore, the rotor hub 140 may rotate. In addition, the shaft 130 to which the rotor hub 140 is fixedly installed may rotate together with the rotor hub 140 by the rotation of the rotor hub 140.

Meanwhile, the rotor hub body 142 may be provided with an extension wall part 142b extended in the downward axial direction so as to form, together with the outer peripheral surface of the sleeve 120, an interface F1 between the lubricating fluid and air, that is, a liquid-vapor interface F1.

An inner surface of the extension wall part 142b may be disposed so as to face the outer peripheral surface of the sleeve 120, and at least one of the outer peripheral surface of the sleeve 120 and the inner surface of the extension wall part 142b may be inclined so as to form the liquid-vapor interface F1.

That is, at least one of the outer peripheral surface of the sleeve 120 and the inner surface of the extension wall part 142b may be inclined so as to form the liquid-vapor interface F1 through a capillary phenomenon.

In addition, both of the outer peripheral surface of the sleeve 120 and the inner surface of the extension wall part 142b may be inclined. In this case, both of the inclination angles of the outer peripheral surface of the sleeve 120 and the inner surface of the extension wall part 142b may be different from each other.

Meanwhile, a space formed by the inner surface of the extension wall part 142b and the outer peripheral surface of the sleeve 120 is called a sealing part 106, and the liquid-vapor interface F1 may be disposed in the sealing part 106.

In addition, an inner diameter portion of the rotor hub body 142 may include a protrusion part 142c inclined so as to correspond to the downwardly inclined surface 128 of the sleeve 120.

The protrusion part 142c may serve to increase an area of an inner peripheral surface of the rotor hub body 142. Therefore, a contact area between the rotor hub 140 and the shaft 130 may be increased.

As a result, coupling force between the rotor hub 140 and the shaft 130 may be increased due to the increase in the contact area between the rotor hub 140 and the shaft 130.

A more detailed description thereof will be provided below. The rotor hub 140 and the shaft 130 may be coupled to each other by an adhesive and/or press-fitting. In this case, the rotor hub 140 and the shaft 130 need to be coupled to each other while having predetermined coupling force therebetween so as not to be separated from each other even though external impact is applied thereto.

That is, the inner peripheral surface of the rotor hub body 142 forming the mounting hole 142a needs to have an axial length capable of generating the coupling force of a predetermined magnitude or more by contacting the shaft 130.

To this end, the rotor hub body 142 includes the protruding part 142c, such that the contact area between the shaft 130 and the rotor hub body 142 may be increased. Therefore, the coupling force between the shaft 130 and the rotor hub 140 may be further increased.

In addition, the protrusion part 142c may have a corresponding inclined surface 142d so as to correspond to the downwardly inclined surface 128 of the sleeve 120.

Therefore, in the case in which the external impact is applied to the rotor hub body 142, damage to the rotor hub body 142 at the inner diameter portion of the rotor hub body 142 may be further suppressed.

That is, in the case in which a lower surface of the protrusion part 142c is not inclined (for example, in the case in which a transversal cross section of the protrusion part has a rectangular shape), an edge of the protrusion part may be easily damaged due to the external impact at the time of generation of the external impact. In this case, foreign materials generated due to the damage are introduced into the bearing clearance, such that rotation characteristics of the shaft 130 may be deteriorated.

However, since the corresponding inclined surface 142d of the protrusion part 142c and the downwardly inclined surface 128 of the sleeve 120 disposed to face the corresponding inclined surface 142d of the protrusion part 142c are inclined as described above, the damage may be decreased at the time of generation of the external impact. Further, the deterioration of the rotation characteristics of the shaft 130 may be prevented.

Further, in the case in which the lower surface of the protrusion part 142c is not inclined (for example, in the case in which the transversal cross section of the protrusion part 142c has the rectangular shape), since a bearing clearance formed by the protrusion part that is not inclined and the sleeve 120 is bent at an angle of 90 degrees, a flow of the lubrication fluid may be hindered and a pressure change may be generated. Therefore, there is a risk that an air bubble will be generated.

However, since the corresponding inclined surface 142d of the protrusion part 142c and the downwardly inclined surface 128 of the sleeve 120 are inclined as described above, the lubricating fluid may more easily flow and the pressure change may be decreased.

Further, since external force may be dispersed in a horizontal direction and a vertical direction by the inclined protrusion part 142c at the time of the external impact, the damage to the rotor hub 142 due to the external impact may be further decreased.

As described above, even in the case of decreasing a thickness of the rotor hub body 142 in order to implement thinness, a decrease in the contact area between the shaft 130 and the inner diameter portion of the rotor hub body 142 is suppressed by the protrusion part 142c, whereby a decrease in the coupling force between the shaft 130 and the rotor hub 140 may be prevented. Therefore, separation between the shaft 130 and the rotor hub 140 due to the external impact may be prevented.

In addition, the corresponding inclined surface 142d of the protrusion part 142c is inclined, whereby the damage to the rotor hub body 142 may be decreased, the lubricating fluid may more easily flow, and the pressure change may be decreased.

Meanwhile, although the case in which the corresponding inclined surface 142d of the protrusion part 142c and the downwardly inclined surface 128 of the sleeve 120 are inclined at the same angle to thereby be disposed in parallel with each other has been described by way of example in the present embodiment, the present invention is not limited thereto.

That is, the corresponding inclined surface 142d and the downwardly inclined surface 128 may also be inclined so as to have different gradients.

The thrust member 150 may be a fixed member configuring, together with the base member 110 and the sleeve 120, the stator 20. In addition, the thrust member 150 may be installed in the installation groove 127 of the sleeve 120 and form a connection part 170 connected to the circulation hole 121 at the time of being installed in the installation groove 127.

The connection part 170 may be formed by the sleeve 120 and the rotor hub 140 and serve to allow the sealing part 106 in which the liquid-vapor interface F1 is disposed to be in communication with the circulation hole 121. A detailed description thereof will be provided below.

Meanwhile, a thickness of an inner diameter portion of the thrust member 150 (an axial length of the inner diameter portion of the thrust member 150) may be different from that of an outer diameter portion thereof (that is, an axial length of the outer diameter portion thereof).

As an example, a transversal cross section of the thrust member 150 may have an approximately trapezoidal shape. More specifically, a radial length of an upper end portion of the thrust member 150 may be longer than that of a lower end portion thereof. In addition, the thrust member 150 may have a constant inner diameter.

In addition, the thrust member 150 may have an inner peripheral surface contacting an inner wall surface of the installation groove 127 and a lower surface contacting the bottom surface of the installation groove 127. Further, the thrust member 150 may include an inclined surface 152 extended from the lower surface thereof.

As described above, the transversal cross section of the thrust member 150 has the approximately trapezoidal shape, whereby damage to the thrust member 150 may be decreased at the time of external impact.

Meanwhile, in the case in which the thrust member 150 is installed in the installation groove 127, a facing surface 127a of the installation groove 127 disposed to face the inclined surface 152 and the inclined surface 152 may be disposed to be spaced apart from each other by a predetermined distance to form the connection part 170.

As described above, in the case in which the thrust member 150 is installed on the sleeve 120, the thrust member 150 and the sleeve 120 may form the connection part 170 to connect the circulation hole 121 and the sealing part 106 to each other.

Here, the facing surface 127a of the installation groove 127 disposed to face the inclined surface 152 may have a gradient different from that of the inclined surface 152, and a clearance formed by the inclined surface 152 and the facing surface 127a of the installation groove 127 may become narrower toward the outer diameter direction. That is, the connection part 170 may have a gap that is narrowed in the outer diameter direction. When the connection part 170 has the above-mentioned configuration, the air bubble may be easily discharged to a part of the connection part 170 at which a first gap extension groove 152a is formed, and the lubricating fluid may be easily circulated at another part of the connection part 170.

As a result, since the bearing clearance formed by the sleeve 120 and the cover member 160 and the sealing part 106 are in communication with each other only by installing the thrust member 150 on the sleeve 120, generation of negative pressure may be decreased.

In other words, since the bearing clearance formed by the sleeve 120 and the cover member 160 and the sealing part 106 are in communication with each other by the circulation hole 121 and the connection part 170, the generation of the negative pressure in the bearing clearance formed by the sleeve 120 and the cover member 160 may be decreased.

Furthermore, the air bubble generated in the bearing clearance may be more smoothly discharged to the outside of the bearing clearance.

In addition, a component for decreasing the generation of the negative pressure may be more easily formed as compared with the case in which only the circulation hole is formed so that the bearing clearance formed by the sleeve 120 and the cover member 160 and the sealing part 106 are in communication with each other. That is, in the case in which the circulation hole is formed so that the bearing clearance formed by the sleeve 120 and the cover member 160 and the sealing part 106 are in communication with each other, generation of a defect in manufacturing the sleeve 120 may be decreased.

Further, the connection part 170 may be formed in the circumferential direction between the sleeve 120 and the thrust member 150, and at least any one part of the connection part 170 may have a radial gap lager than that of another part thereof in the circumferential direction. That is, the connection part 170 may be provided with a part having a large gap in the radial direction.

In other words, the inclined surface 152 of the thrust member 150 forming the connection part 170 between the thrust member 150 and the sleeve 120 may include the first gap extension groove 152a formed in the axial direction. Therefore, a predetermined part of the connection part 170 may have a radial gap wider than that of another part thereof by the first gap extension groove 152a. That is, a wider space may be formed at any one part, that is, apart at which the first gap extension groove 152a is formed, than another part. Meanwhile, although the case in which one first gap extension groove 152a is formed has been shown in FIG. 3, this is only an example, and the present invention is not limited thereto. That is, two or more first gap extension grooves 152a may also be formed. In addition, although the case in which the circulation hole 121 and the first gap extension groove 152a are disposed at the same position in the circumferential direction and are continuously formed in the axial direction has been shown in FIGS. 1 through 3, this is only an example, and the present invention is not limited thereto. That is, the circulation hole 121 and the first gap extension groove 152a may also be disposed at different positions in the circumferential position.

Here, the connection part 170 may be continuously or discontinuously formed in the circumferential direction.

When the connection part has the above-mentioned configuration, even though an air bubble formed by air has a large size, it may be easily discharged to the outside.

Further, in the case in which a radial gap of the connection part is constant in the circumferential direction, it is very difficult to separate the air from the lubricating fluid. However, in the case in which any one part of the connection part 170 in the radial direction has a gap wider than that of another part thereof as in the embodiment of the present invention, even though the lubricating fluid and the air bubble are mixed with each other, the air bubble may be easily separated from the lubricating fluid using the capillary phenomenon. The reason is that the air bubble is easily collected in a relatively wide space and the lubricating fluid is easily collected in a relatively narrow space. Therefore, when spaces of the connection part 170 itself have different sizes, since the air bubble is easily collected in a relative wide space of the connection part 170, for example, a part at which the first gap extension groove 152a is formed, it may be very easy to separate the air bubble from the lubricating fluid.

In addition, the air bubble collected in the relatively wide space of the connection part 170 may have a size larger as compared with a general case, such that it may be easily discharged to the outside.

Further, since the air bubble may be easily collected in the wide space using the size of the space in the connection part 170 itself, the air contained in the lubricating fluid may be more efficiently discharged to the outside. Therefore, a content of air contained in the lubricating fluid re-circulated into the bearing clearance may be very low or may hardly be present. Therefore, reliability of an operation of the spindle motor may be increased, and abnormal driving may be decreased to improve a lifespan of the spindle motor.

In addition, since the lubricating fluid is filled in the entirety of the relatively wide space of the connection part 170, an amount of stored lubricating fluid may be increased as compared with the case in which the size of the gap in the connection part is not changed. Therefore, the lifespan of the spindle motor may be increased.

Meanwhile, the thrust member 150 may be bonded to the installation groove 127 of the sleeve 120 by an adhesive. In addition, a groove in which the adhesive may be filled may be formed at an edge at which the inner wall surface and the lower surface of the installation groove 127 meet each other to increase coupling force between the thrust member 150 and the sleeve 120. The thrust member 150 may also be coupled to the installation groove 127 by a method such as a press-fitting method, a welding method, or the like.

In addition, the thrust member 150 may be formed of a material different from that of the sleeve 120. That is, the thrust member 150 may be formed of a material having excellent abrasion resistance.

However, the present invention is not limited thereto. That is, the thrust member 150 and the sleeve 120 may also be formed of the same material. In this case, outer surfaces of the thrust member 150 and the sleeve 120 may be coated with different materials. That is, the outer surface of the thrust member 150 may also be coated with a material for improving the abrasion resistance.

Meanwhile, a thrust dynamic groove 154 may be formed in an upper surface of the thrust member 150. However, the thrust dynamic groove 154 is not limited to being formed in the upper surface of the thrust member 150, but may also be formed in the rotor hub.

The cover member 160, which is a fixed member configuring, together with the base member 110, the sleeve 120, and the thrust member 150, the stator 20, may be fixedly installed on a lower surface of the sleeve 120 to prevent leakage of the lubricating fluid.

That is, the cover member 160 may be bonded to the mounting groove 123 of the sleeve 120 by at least one of an adhering method and a welding method.

Hereinafter, a spindle motor according to another embodiment of the present invention will be described with reference to the accompanying drawings. However, components that are the same as the components included in the spindle motor according to the embodiment of the present invention described above will be denoted by the same reference numerals, and an illustration and a detailed description thereof will be omitted.

Figure 6:
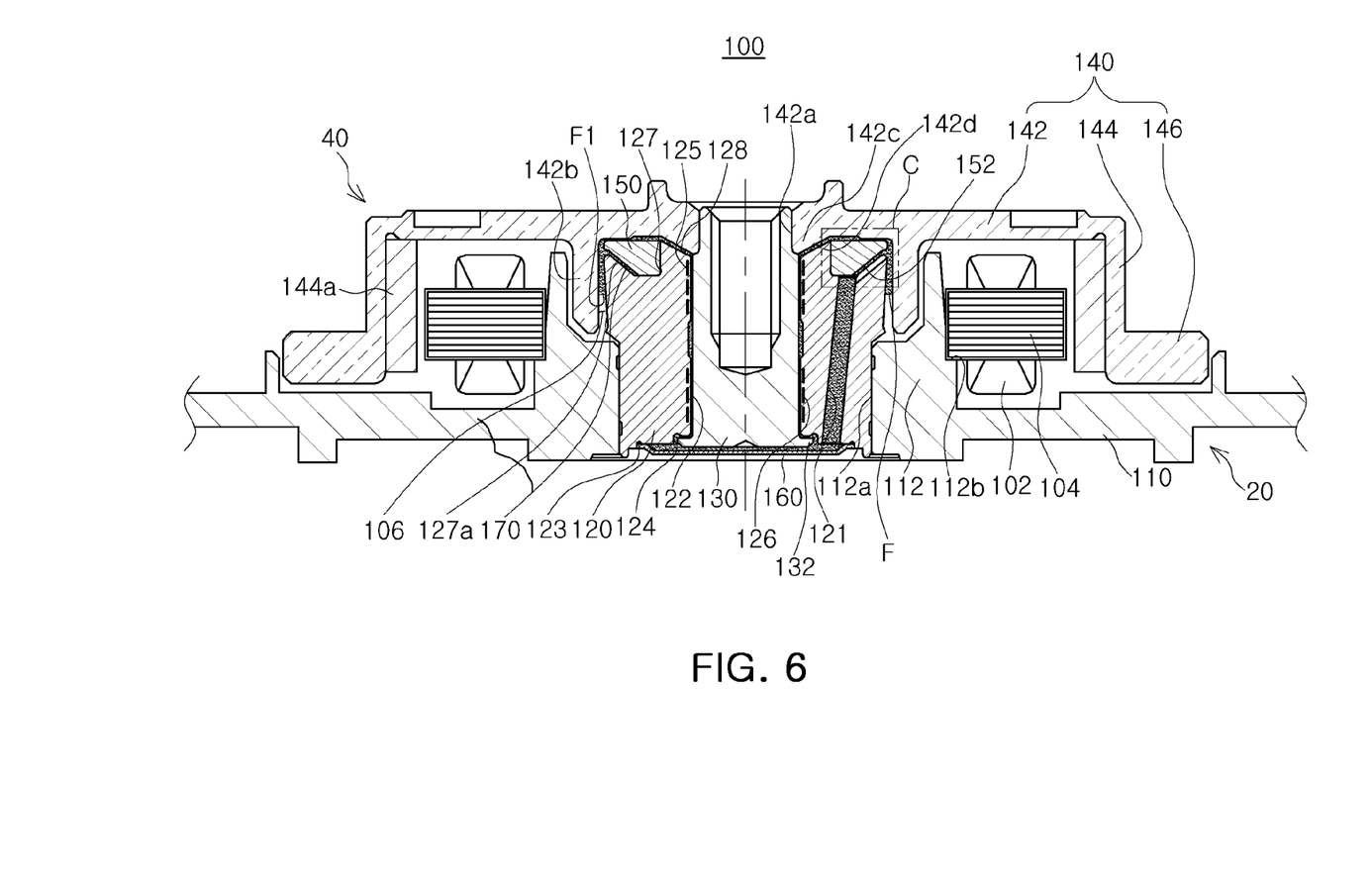
FIG. 6 is a schematic cross-sectional view showing a spindle motor according to another embodiment of the present invention.
Figure 7:
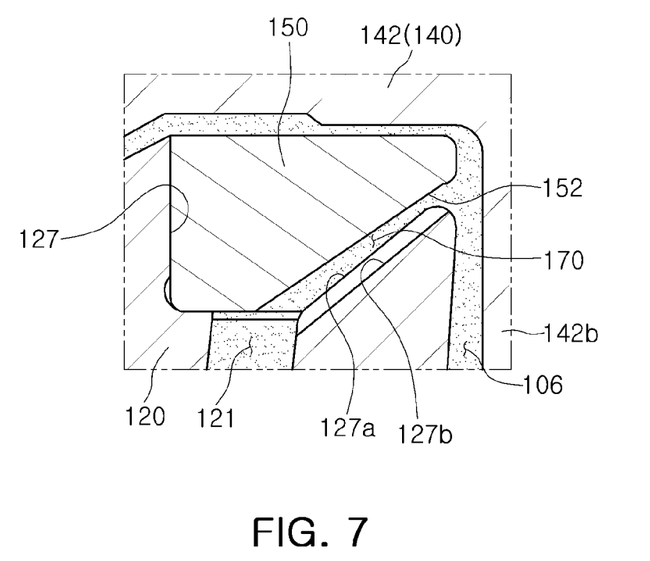
FIG. 7 is an enlarged view showing the part C of FIG. 6.

FIG. 6 is a schematic cross-sectional view showing a spindle motor according to another embodiment of the present invention; FIG. 7 is an enlarged view showing the part C of FIG. 6; and FIG. 8 is an assembled cross-sectional view of a sleeve and a thrust member included in the spindle motor according to another embodiment of the present invention.

Figure 8:
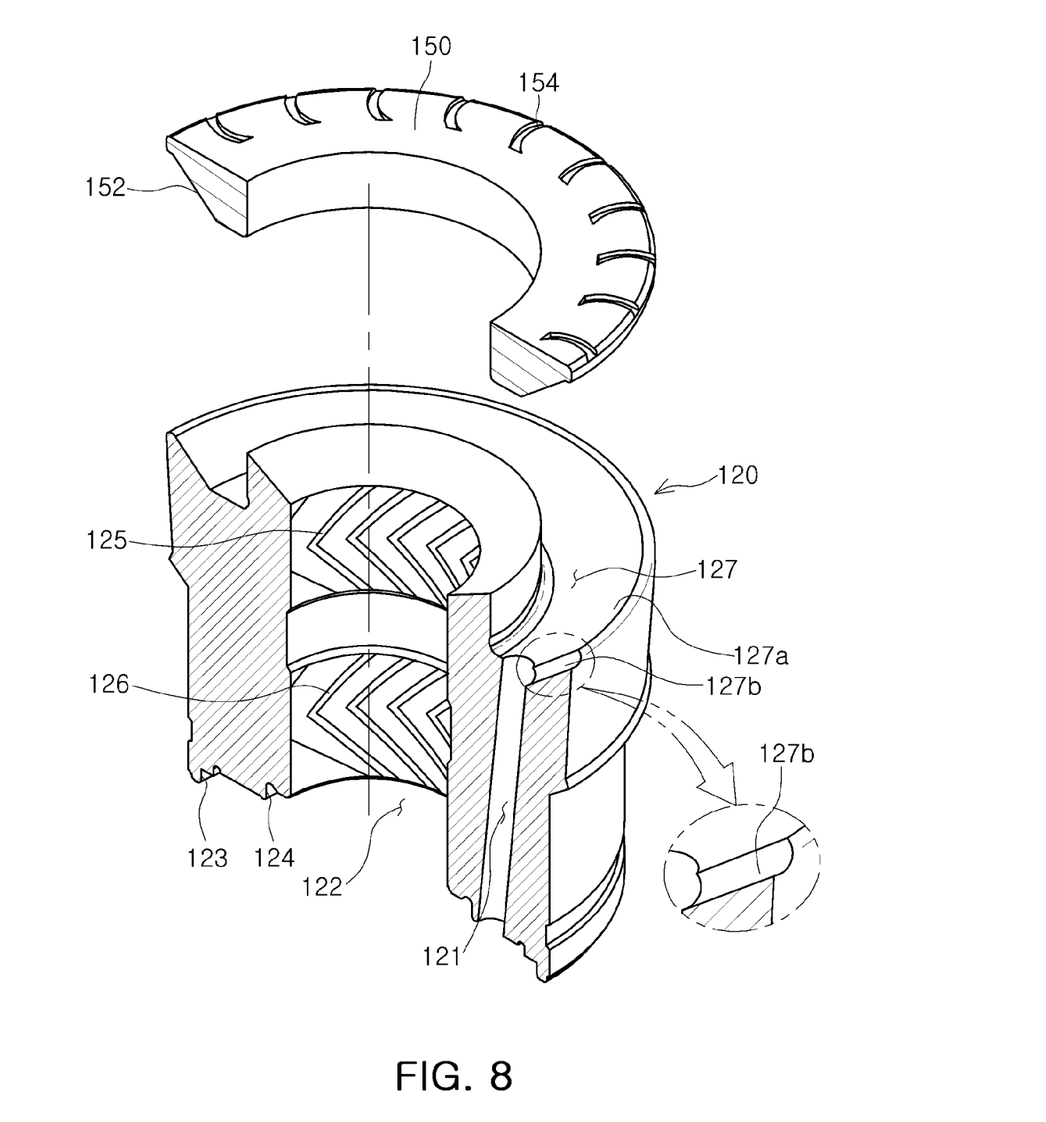
FIG. 8 is an assembled cross-sectional view of a sleeve and a thrust member included in the spindle motor according to another embodiment of the present invention.

Referring to FIGS. 6 through 8, the spindle motor 200 according to another embodiment of the present invention is different from the spindle motor 100 according to the embodiment of the present invention in that at least any one part of a connection part 170 in the circumferential direction has a radial gap wider than that of another part thereof in the circumferential direction.

That is, the spindle motor 100 according to the embodiment of the present invention includes the first gap extension groove 152a formed in the inclined surface 152 of the thrust member 150 to accomplish an object of the present invention. However, the spindle motor 200 according to another embodiment of the present invention is different from the spindle motor 100 according to the embodiment of the present invention in that it includes a second gap extension groove 127b formed in the facing surface 127a of the installation groove 127 of the sleeve 120 to accomplish an object of the present invention. Next, a detailed description thereof will be provided.

In the spindle motor 200 according to another embodiment of the present invention, the connection part 170 may be formed in the circumferential direction between the sleeve 120 and the thrust member 150, and at least any one part of the connection part 170 may have a radial gap lager than that of another part thereof in the circumferential direction. That is, the connection part 170 may be provided with a part having a large gap in the radial direction.

In other words, the facing surface 127a of the installation groove 127 forming the connection part 170 between the inclined surface 152 of the thrust member 150 and the facing surface 127a of the installation grove 127 may be provided with the second gap extension groove 127b formed in the axial direction. Therefore, a predetermined part of the connection part 170 may have a radial gap wider than that of another part thereof by the second gap extension groove 127b. That is, a space wider than that of another part may be formed. Meanwhile, although the case in which one second gap extension groove 127b is formed has been shown in FIG. 8, this is only an example, and the present invention is not limited thereto. That is, two or more second gap extension grooves 127b may also be formed. In addition, although the case in which the circulation hole 121 and the second gap extension groove 127b are disposed at the same position in the circumferential direction and are continuously formed in the axial direction has been shown in FIGS. 6 through 8, this is only an example, and the present invention is not limited thereto. That is, the circulation hole 121 and the second gap extension groove 127b may also be disposed at different positions in the circumferential direction.

Here, the connection part 170 may be continuously or discontinuously formed in the circumferential direction.

When the connection part has the above-mentioned configuration, even though an air bubble formed by air has a large size, it may be easily discharged to the outside.

Further, in the case in which a radial gap of the connection part is constant in the circumferential direction, it is very difficult to separate the air from the lubricating fluid. However, in the case in which any one part of the connection part 170 in the radial direction has a gap wider than that of another part thereof as in the embodiment of the present invention, even though the lubricating fluid and the air bubble are mixed with each other, the air bubble may be easily separated from the lubricating fluid using the capillary phenomenon. The reason is that the air bubble is easily collected in a relatively wide space and the lubricating fluid is easily collected in a relatively narrow space. Therefore, when spaces of the connection part 170 itself have different sizes, since the air bubble is easily collected in a relative wide space of the connection part 170, for example, a part at which the second gap extension groove 127b is formed, it may be very easy to separate the air bubble from the lubricating fluid.

In addition, the air bubble collected in the relatively wide space of the connection part 170 may have a size larger as compared with a general case, such that it may be easily discharged to the outside.

Further, since the air bubble may be easily collected in the wide space using the size of the space in the connection part 170 itself, the air contained in the lubricating fluid may be more efficiently discharged to the outside. Therefore, a content of air contained in the lubricating fluid re-circulated into the bearing clearance may be very low or may hardly be present. Therefore, reliability of an operation of the spindle motor may be increased, and abnormal driving may be decreased to improve a lifespan of the spindle motor.

In addition, since the lubricating fluid is filled in the entirety of the relatively wide space of the connection part 170, an amount of stored lubricating fluid may be increased as compared with the case in which the size of the gap in the connection part is not changed. Therefore, the lifespan of the spindle motor may be increased.

Further, the facing surface 127a of the installation groove 127 disposed to face the inclined surface 152 may have a gradient different from that of the inclined surface 152, and a clearance formed by the inclined surface 152 and the facing surface 127a of the installation groove 127 may become narrower toward the outer diameter direction. That is, the connection part 170 may have a gap that is narrowed in the outer diameter direction. When the connection part 170 has the above-mentioned configuration, the air bubble may be easily discharged to a part of the connection part 170 at which the second gap extension groove 127b is formed, and the lubricating fluid may be easily circulated at another part of the connection part 170.

Meanwhile, although the present invention has been described with respect to each of the spindle motor 100 according to the embodiment of the present invention and the spindle motor 200 according to another embodiment of the present invention, the present invention may also include a spindle motor including all features of the spindle motor 100 according to the embodiment of the present invention and the spindle motor 200 according to another embodiment of the present invention as well as these respective embodiments.

Figure 9:
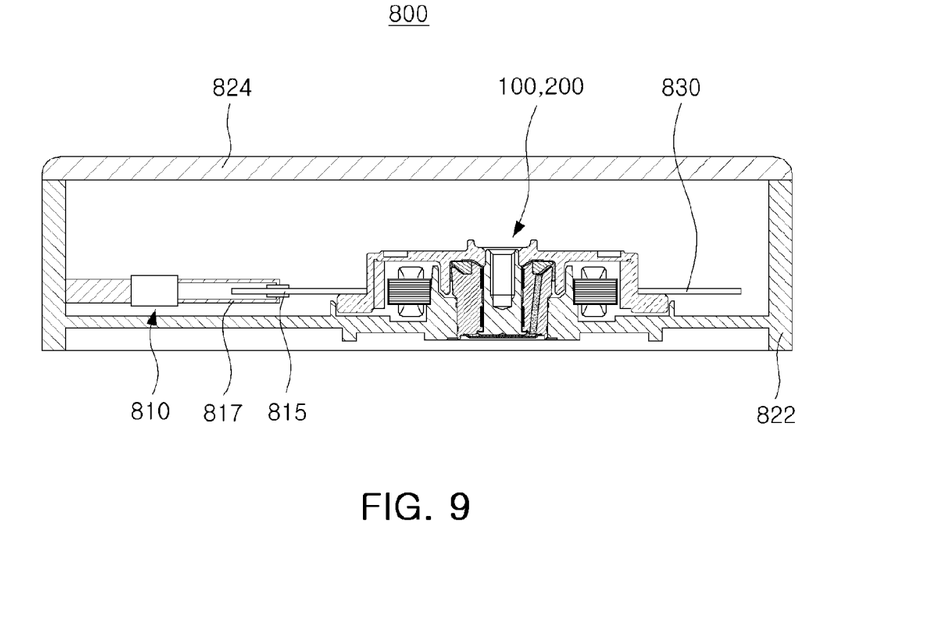
FIG. 9 is a schematic cross-sectional view of a disk driving device using the spindle motor according to the embodiment of the present invention.

Referring to FIG. 9, a recording disk driving device 800 having the spindle motor 100 or 200 according to the present invention mounted therein may be a hard disk drive and include the spindle motor 100 or 200, a head transfer part 810, and a housing 820.

The spindle motor 100 or 200 may have all features of the motor according to the present invention described above and have a recording disk 830 mounted thereon.

The head transfer part 810 may transfer a head 815 detecting information of the recording disk 830 mounted in the spindle motor 100 or 200 to a surface of the recording disk of which the information is to be detected.

Here, the head 815 may be disposed on a support part 817 of the head transfer part 810.

The housing 820 may include a motor mounting plate 822 and a top cover 824 shielding an upper portion of the motor mounting plate 822 in order to form an internal space receiving the spindle motor 100 or 200 and the head transfer part 810 therein.

As set forth above, according to the embodiments of the present invention, a spindle motor capable of decreasing generation of negative pressure may be provided. That is, a spindle motor capable of easily connecting a sealing part in which a liquid-vapor interface is disposed and a lower end portion of a bearing clearance to each other in order to decrease generation of negative pressure may be provided.

In addition, according to the embodiment of the present invention, a motor capable of easily discharging air that may be contained in a lubricating fluid may be provided. Particularly, according to the embodiments of the present invention, air is easily separated from the lubricating fluid, whereby the air may be easily discharged and air that may be contained in a lubricating fluid re-circulated to a bearing clearance may be more reliably removed.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
    a sleeve fixedly installed on a base member and having a circulation hole formed in an axial direction;
    a shaft rotatably inserted into the sleeve;
    a rotor hub fixedly installed on an upper end portion of the shaft in the axial direction; and
    a thrust member installed in an installation groove formed in an upper portion of the sleeve in the axial direction and forming a connection part at the time of being installed in the installation groove, the connection part allowing the circulation hole to be in communication with a sealing part formed by the sleeve and the rotor hub and having a liquid-vapor interface disposed therein,
    wherein the connection part is formed between the sleeve and the thrust member in a circumferential direction, and at least any one part of the connection part has a radial gap wider than that of another part thereof in the circumferential direction.

2. The spindle motor of claim 1, wherein a transversal cross section of the thrust member in a radial direction has a trapezoidal shape.

3. The spindle motor of claim 2, wherein the thrust member has an inclined surface, and
    a facing surface of the installation groove disposed to face the inclined surface and the inclined surface are disposed to be spaced apart from each other by a predetermined distance to form the connection part in the case in which the thrust member is installed in the installation groove.

4. The spindle motor of claim 1, wherein a surface of the thrust member forming the connection part between the thrust member and the sleeve is provided with a first gap extension groove formed in the axial direction.

5. The spindle motor of claim 1, wherein a facing surface of the installation groove of the sleeve forming the connection part between the sleeve and the thrust member is provided with a second gap extension groove formed in the axial direction.

6. The spindle motor of claim 1, wherein the thrust member includes a thrust dynamic groove formed in an upper surface thereof in order to generate thrust fluid dynamic pressure.

7. The spindle motor of claim 1, wherein the sleeve and the thrust member are formed of different materials or have outer surfaces coated with different materials.

8. The spindle motor of claim 1, further comprising a cover member fixedly installed on a lower surface of the sleeve to prevent leakage of a lubricating fluid.

9. The spindle motor of claim 1, wherein the thrust member has an inner peripheral surface and a lower surface bonded to the installation groove of the sleeve.

10. The spindle motor of claim 1, wherein the connection part has a gap that is narrowed in an outer diameter direction.

11. A hard disk drive comprising:
    the spindle motor of claim 1 rotating a disk by power applied thereto through a substrate;
    a magnetic head writing data to and reading data from the disk; and
    a head driving part moving the magnetic head to a predetermined position on the disk.

* * * * *